Oct. 16, 1923.  1,470,974
F. HARDINGE
VALVE
Filed May 16, 1921  3 Sheets-Sheet 1
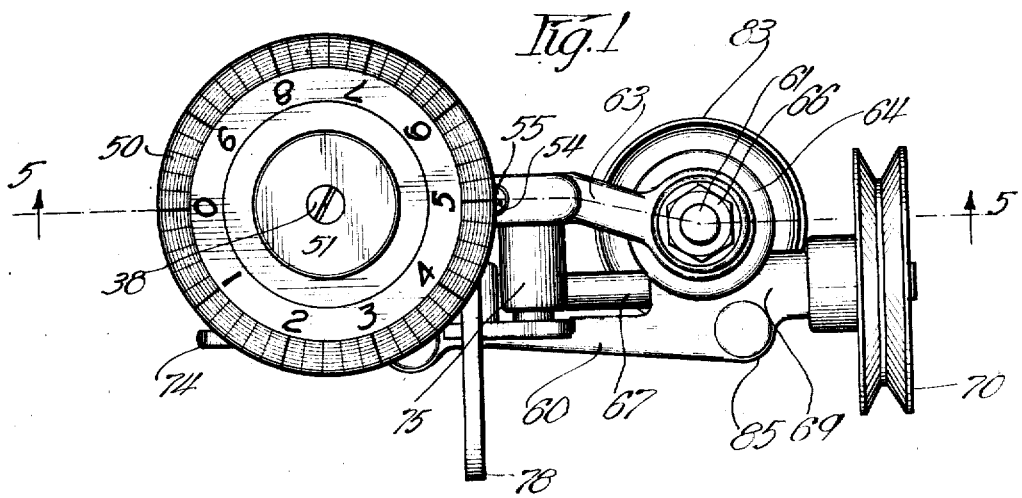
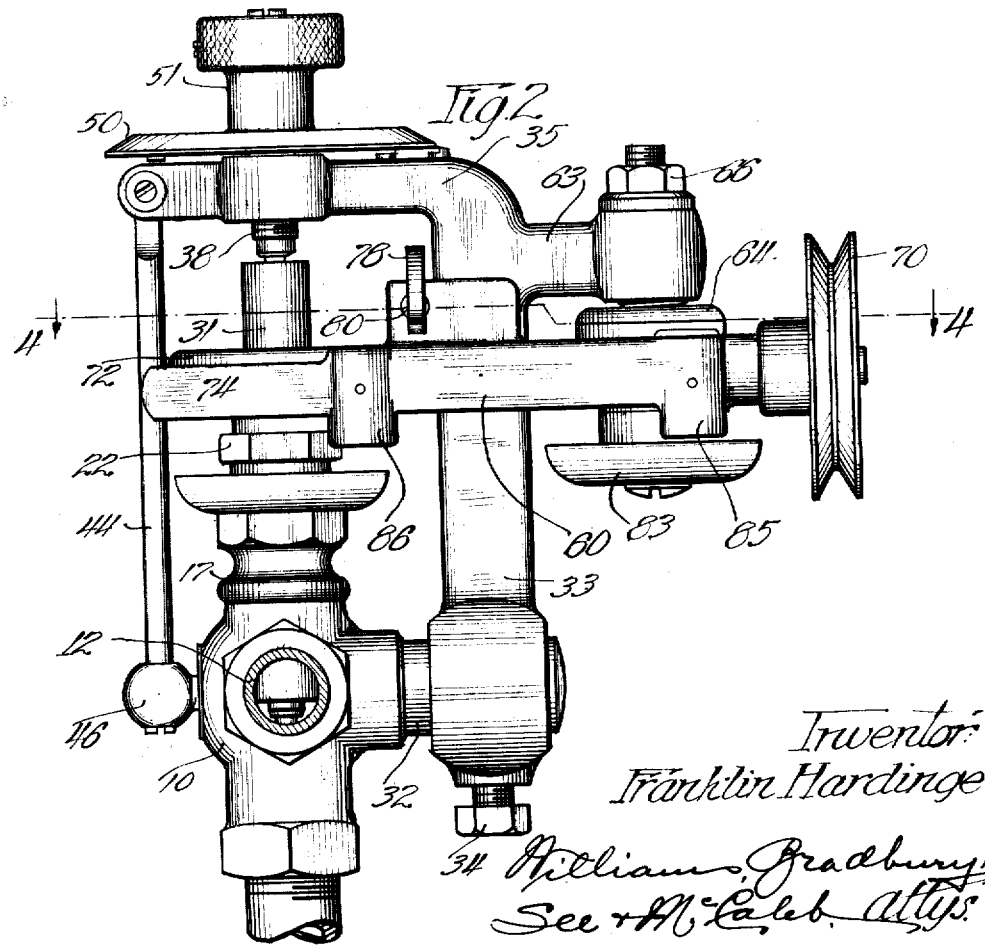
Inventor:
Franklin Hardinge
William Bradbury
See & McCaleb Attys.

Oct. 16, 1923.
F. HARDINGE
VALVE
Filed May 16, 1921
1,470,974
3 Sheets-Sheet 2
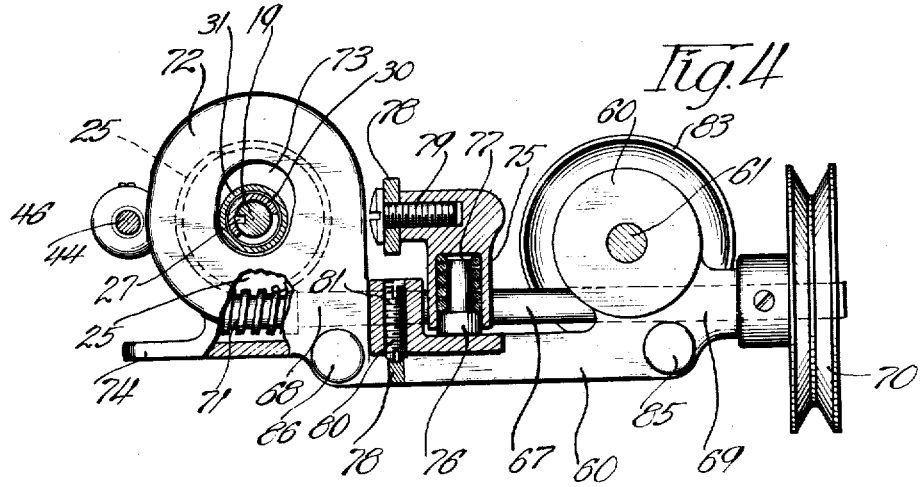
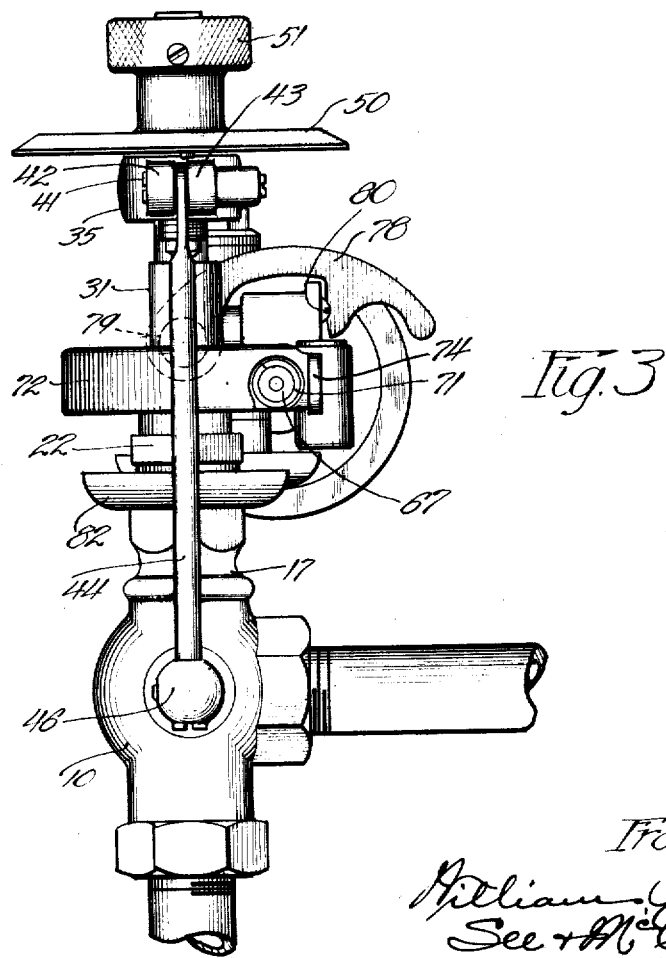
Inventor:
Franklin Hardinge
William Bradbury
See & McCaleb, Attys.

Oct. 16, 1923.
F. HARDINGE
VALVE
Filed May 16, 1921
1,470,974
3 Sheets-Sheet 3
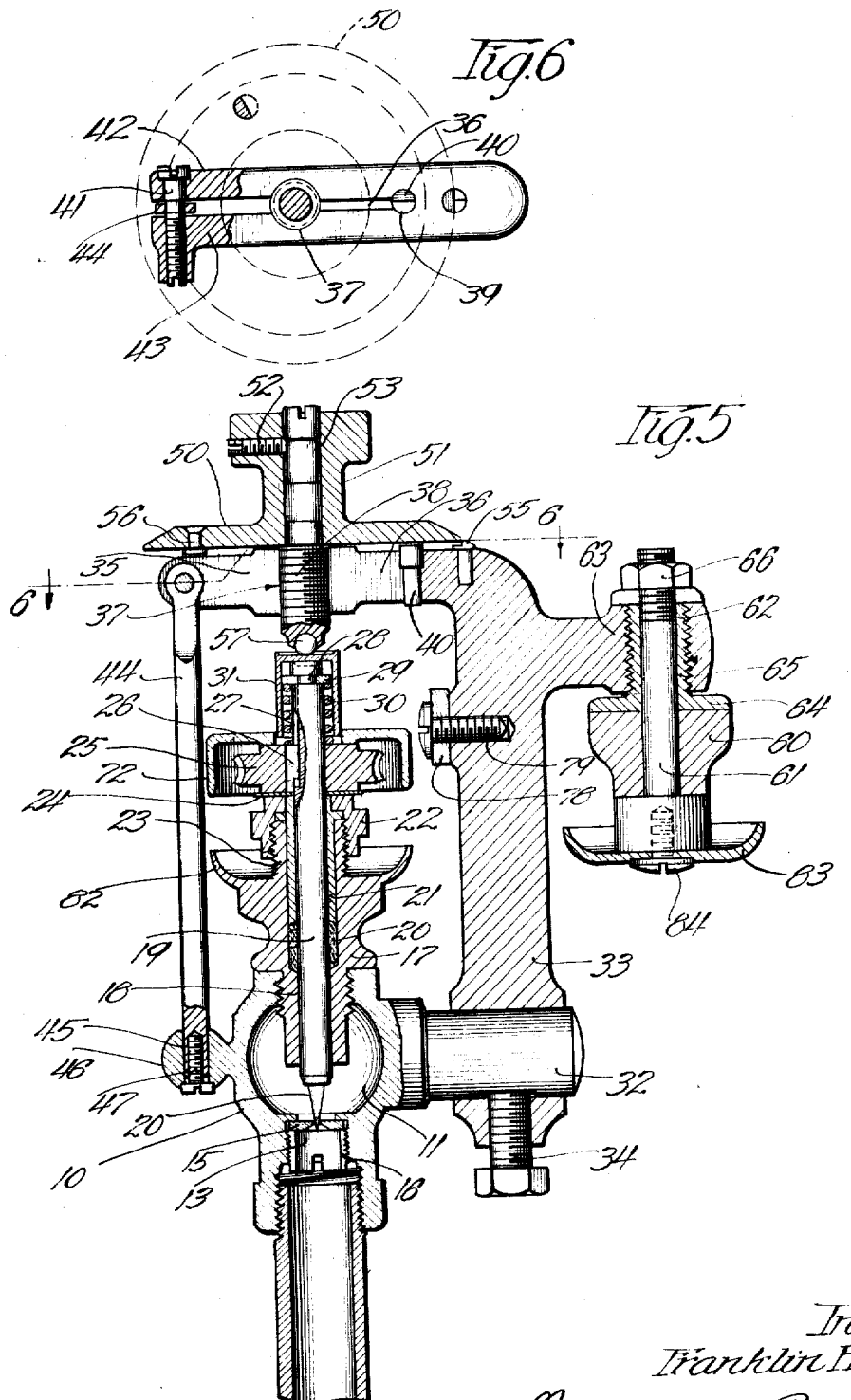
Inventor:
Franklin Hardinge Patented Oct. 16, 1923.

1,470,974

UNITED STATES PATENT OFFICE.

FRANKLIN HARDINGE, OF CHICAGO, ILLINOIS, ASSIGNOR TO HARDINGE BROTHERS, INC., OF CHICAGO, ILLINOIS, A CORPORATION OF ILLINOIS.

VALVE.

Application filed May 16, 1921. Serial No. 470,212.

*To all whom it may concern:*

Be it known that I, FRANKLIN HARDINGE, a citizen of the United States, and resident of Chicago, in the county of Cook and State of Illinois, have invented a certain new and useful Improvement in Valves, of which the following is a full, clear, concise, and exact description, reference being had to the accompanying drawings, forming a part of this specification.

My invention relates to improvements in valves, and is particularly concerned with improvements in that type of valve which comprise means for automatically preventing the valve from becoming fouled and clogged up.

While my invention is particularly designed to be used in connection with devices which consume petroleum distillates and particularly heavy petroleum distillates or residua, especially where comparatively small quantities of such distillates or residua are to be continuously supplied to the consuming device, it is, nevertheless, not limited to this particular use, but is capable of being employed wherever it is desired to control the flow of any fluid which may hold any dirt or other matter in suspension which would tend to clog the valve.

The objects of my invention are

First—to provide a valve of the character described that will not become clogged by dirt or other matter held in suspension in the fluid, the flow of which is to be controlled.

Second—to provide a valve of the character described which is self-cleaning.

Third—to provide a valve which will continuously control the flow of comparatively small quantities of liquid without becoming stopped up.

Fourth—to provide a valve such as described which can be accurately adjusted for fine gradations of flow.

Fifth—to provide a valve of the character described which is so constructed as to permit very accurate assembly and adjustment of the various parts thereof, and Sixth—to provide a valve such as described which is of simple construction, rugged and economical to manufacture.

These and other objects will appear as the description progresses, reference being had to the accompanying drawings, in which—

Figure 1 is a plan view,
Figure 2 is a front elevation,
Figure 3 is a side elevation,
Figure 4 is a horizontal transverse section taken on line 4—4 of Figure 2,
Figure 5 is a central, vertical section, taken on line 5—5 of Figure 1, and
Figure 6 is a sectional detail taken on line 6—6 of Figure 5.

Throughout the several views, similar reference characters will be used to refer to similar parts.

My improved valve comprises a body member 10, having a valve chamber 11, formed therein which is provided with an inlet port 12 and an outlet port 13. The outlet port 13 is provided with a disk shaped valve seat 15 which is securely held in position by the threaded sleeve 16, once the seat has been centered by the needle.

A hollow plug 17 is threaded thru the wall of the chamber 11, opposite the outlet port 13. This plug is provided with a bore 18, which forms a bearing for valve stem 19, the inner end of which is provided with a needle valve 20 which co-acts with the valve seat 15 to regulate the flow of liquid thru the valve. Escape of liquid along the valve stem 19 is prevented by the packing 20, which is compressed by the bushing 21.

The bushing 21 is held in place by the follower 22, which is adjustably secured to the threaded extension 23 of the plug 17. A fibre washer 24 rests upon the upper end of the follower 22 and supports the worm gear 25 which is splined to the valve stem 19 by means of the spline 26, operating in the slot 27, cut in the side of the valve stem. The outer end of the valve stem has an annular groove 28 formed therein which receives the split washer 29. A compression spring 30 is located between the projecting edge of the split washer 29 and the top of the worm gear 25, and tends to lift the valve stem 19 of the valve 20 upwardly away from the valve seat 15. A cap 31 encloses the upper end of the valve stem 19 and the compression spring.

A cylindrical boss 32 projects from the side wall of the chamber 11 and thru an opening formed in the lower end of the bracket 33. The bracket is adjustably held on the boss 32 by means of the set screw 34. The bracket 33 is provided with an angularly disposed portion 35 which overhangs the upper end of the valve stem 19. The overhanging portion 35 has a slot 36 extending longitudinally thereof, as shown in Figure 5 and is also provided with a screw threaded bore 37 for receiving the threaded adjusting screw 38 and a smaller bore 39 for receiving the stop 40.

A screw 41 at the outer end of the slot 36 which freely passes thru the end of the bifurcation 42, formed by the slot 36 is threaded into the adjacent end of the bifurcation 43, and provides means for adjusting the frictional engagement between the screw 38 and the threads of the opening 37. The screw 41 also provides an anchoring means for one end of the tie rod 44, the opposite end of which is received in the bore 45 of the extension 46 from the side of the body member. The screw 47, which bears against one side of the extension 46 and is threaded into the adjacent end of the tie rod, provides means for adjusting the tension on the tie rod. The tie rod 44 merely provides means for preventing any flexure of the overhanging portion 35, which would tend to change the adjustment of the needle valve 20.

The dial plate 50 is provided with the hub 51, which receives the upper end of the screw 38. A set screw 52, the inner end of which engages the bottom of the shallow annular groove 53, formed adjacent the upper end of the screw 38, provides means whereby the dial can be adjusted either longitudinally or angularly with respect to the screw 38. As shown in Figure 1, the dial 50 is provided with graduations, which co-act with the hair line 54 in the top of the index needle 55 to indicate the extent to which the valve is opened.

The rivet 56 which passes thru the dial, carries a head on the lower side of the dial, which co-acts with the projecting end of the stop 40 to limit the adjustment of the needle toward the valve seat 15, so that the needle valve cannot be moved toward the valve seat more than just sufficient to close the valve. By making the dial 50 angularly adjustable upon the screw 38, the screw 38 can first be adjusted to cause the needle valve 20 to just close the opening in the valve seat 15 and the dial can then be adjusted relatively to the screw 38, so that the index needle will indicate the zero position of the dial.

From the above description, it will be clear that when the screw 38 is adjusted toward the end of the valve stem 19, the bearing ball 57, carried by the inner end of the screw 38 will engage the end of the cap 31 and cause it to push the valve stem 19 and consequently the needle valve 20 downwardly toward the valve seat 15 against the tension of the spring 30, and that upon reverse movement of the screw 38, the spring 30, re-acting against the split collar 29, will tend to lift the valve stem 19 and the needle valve 20 away from the valve seat.

On account of the relatively small diameter of the opening in the valve seat 15, it is necessary to provide means for continuously moving the valve relatively to the valve seat, so as to prevent any dirt or other matter, held in suspension, from lodging upon the valve seat or the valve. For this purpose, I provide an arm 60, one end of which is pivotally mounted upon the bolt 61, which extends thru a bore 62 formed in an extension 63, projecting from one side of the bracket 33. The uppermost position of the arm is determined by its contact with the lower side of the flange 64 carried by the bushing 65, which is threaded in the opening 62, and its lowermost position is determined by the adjustment of the nut 66, upon the bolt 61. It will be seen that the arm 60 is adjusted to swing in the plane of the worm wheel 25. A shaft 67 is journalled in the bearings 68 and 69 carried by the arm 60, and to its outer end is secured the grooved pulley 70 which can be driven from any suitable source of power by means of a belt. The inner end of the shaft 67 is provided with a worm wheel 71, which can be brought into driving relation with the worm gear 25. The inner end of the arm 60 carries a disk shaped housing 72, which encloses the worm gear 25 of the worm 71. This housing is provided with a slot 73, which is of sufficient length to permit the arm 60 to swing away from the worm gear 27 sufficiently to disengage the worm 71 from this gear. The free end of the arm 60 is provided with a thumb piece 74, by means of which it can be swung inwardly toward the worm gear 25. A hollow boss 75 projects from the upper end of the bracket 33, and houses the plunger 76 which is urged outwardly by the compression spring 77 against the side of the arm 60. For holding the worm 71 in meshing relation with the gear 25, I provide the latch 78, the front end of which is pivoted upon the screw 79, and the other end of which is adapted to engage over the outwardly projecting end of the screw 80, which is adjustably secured in the arm 60, and locked in its adjusted position by the set screw 81.

At 82 I have illustrated a drip-cup for receiving and holding any oil which may escape along the valve stem 19, and at 83 I have illustrated a second drip cup which is secured to the head of the bolt 61 by the screw 84 and which is adapted to receive any oil which may escape from the oil cup 85, which is formed integrally with the arm 60, for supplying oil to the bearing 69. At 86 I have illustrated another oil cup for supplying oil to the bearing 68.

While I have described the details of construction of the preferred embodiment of my improved valve, it is to be clearly understood that my invention is not limited to these details, but is capable of other adaptations and modifications within the scope of the appended claims.

Having thus described my invention, what I claim is:

1. A valve comprising a body member having a valve chamber formed therein, the walls of which are provided with an inlet port and an outlet port, a disc valve seat removably secured in said outlet port, a hollow plug extending thru the wall of said chamber opposite said outlet port, a valve stem journaled in said hollow plug, a needle valve projecting from the inner end of said valve stem for co-acting with said valve seat, a worm gear splined to said valve stem, a collar on the outer end of said valve stem, a compression spring between said collar and said worm gear, a boss projecting from one side of said valve chamber, a bracket adjustably mounted on said boss and having a portion overhanging the outer end of said valve stem, an adjusting screw threaded into said overhanging portion and engaging the outer end of said valve stem, an arm pivotally mounted on said bracket to swing in the plane of said worm gear, a shaft journaled in said arm, a worm at one end of said shaft for engaging said worm gear, means whereby said shaft can be rotated, and releasable means for locking said worm in engagement with said worm gear.

2. A valve comprising a body member having a valve chamber formed therein, the walls of which are provided with an inlet port and an outlet port, a valve seat in said outlet port, a hollow plug extending thru the wall of said chamber opposite said outlet port, a valve stem journaled in said hollow plug, a needle valve projecting from the inner end of said valve stem for co-acting with said valve seat, a worm gear splined to said valve stem, a collar on the outer end of said valve stem, a compression spring between said collar and said worm gear, a bracket mounted on said chamber and having a portion overhanging the outer end of said valve stem, an adjusting screw threaded into said overhanging portion and engaging the outer end of said valve stem, an arm pivotally mounted on said bracket to swing in the plane of said worm gear, a shaft journaled in said arm, a worm at one end of said shaft for engaging said worm gear, means whereby said shaft can be rotated, and releasable means for locking said worm in engagement with said worm gear.

3. A valve comprising a body member having a valve chamber formed therein, the walls of which are provided with an inlet port and an outlet port, a valve seat in said outlet port, a hollow plug extending thru the wall of said chamber opposite said outlet port, a valve stem journaled in said hollow plug, a needle valve projecting from the inner end of said valve stem for co-acting with the said valve seat, a worm gear splined to said valve stem, a collar on the outer end of said valve stem, a compression spring between said collar and said worm gear, a bracket mounted on said chamber and having a portion overhanging the outer end of said valve stem, an adjusting screw threaded into said overhanging portion and engaging the outer end of said valve stem, a shaft journaled on said bracket, a worm at one end of said shaft for engaging said worm gear, and means whereby said shaft can be rotated.

4. A valve comprising a body member having a valve chamber formed therein, the walls of which are provided with an inlet port and an outlet port, a valve seat in said outlet port, a valve stem journaled in the wall of said valve chamber, a needle valve projecting from the inner end of said valve stem for co-acting with said valve seat, a worm gear splined to said valve stem, a spring for moving said valve away from said seat, a bracket mounted on said chamber and having a portion overhanging the outer end of said valve stem, an adjusting screw threaded into said overhanging portion and engaging the outer end of said valve stem, a shaft journaled on said bracket, a worm at one end of said shaft for engaging said worm gear, and means whereby said shaft can be rotated.

5. A valve comprising a body member having a valve chamber formed therein, the walls of said chamber being provided with inlet and outlet ports, a valve stem rotatably mounted in the walls of said chamber, a valve at the inner end of said valve stem for co-acting with said outlet port, a spring for urging said valve stem in a direction away from said outlet port, means for adjusting said valve stem toward said outlet port, and means for continually rotating said valve stem without changing the adjustment of said valve relatively to said outlet port.

6. A valve comprising a body member having a valve chamber formed therein, the walls of which are provided with inlet and outlet ports, a valve stem rotatably mounted in the walls of said valve chamber and provided at its inner end with a valve for co-acting with said outlet port, means for rotating said valve stem, a screw threaded member for urging said valve stem toward said outlet port, an index dial angularly adjustable upon said screw threaded member and, means co-acting with said dial for limiting the movements of said valve stem toward said outlet port.

7. A valve comprising a body member having a valve chamber formed therein, the walls of which are provided with inlet and outlet ports, a valve stem rotatably mounted in a wall of said valve chamber and provided at its inner end with a valve for co-acting with said outlet port, means for continually rotating said valve stem without changing the adjustment of said valve relative to said outlet port, a screw threaded member for urging said valve stem toward said outlet port, and an index dial upon said screw threaded member.

8. A valve comprising a valve chamber having inlet and outlet ports formed in the wall thereof, a valve stem rotatably mounted in a wall of said chamber, a valve carried by said valve stem for co-acting with one of said ports, means for adjusting said valve stem to and from said last mentioned port, a gear splined to said valve stem, a shaft mounted for movement toward and away from said gear, and a second gear on said shaft for driving said first mentioned gear.

In witness whereof, I hereunto subscribe my name this 11th day of May, 1921.

FRANKLIN HARDINGE.

Witnesses:
ALBIN C. AHLBERG,
EMILE J. BOURGEOIS.